(12) United States Patent
Yang et al.

(10) Patent No.: US 8,522,893 B2
(45) Date of Patent: Sep. 3, 2013

(54) MODULARIZED ULTRASONIC VIBRATION MACHINING APPARATUS

(75) Inventors: Zhong-Yi Yang, Tainan County (TW); Hui-Ping Lin, Changhua County (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 333 days.

(21) Appl. No.: 12/968,801

(22) Filed: Dec. 15, 2010

(65) Prior Publication Data

US 2011/0155407 A1 Jun. 30, 2011

(30) Foreign Application Priority Data

Dec. 31, 2009 (TW) .............................. 98146250 A

(51) Int. Cl.
*B25F 5/02* (2006.01)
(52) U.S. Cl.
USPC ........................... 173/104; 173/217; 173/171
(58) Field of Classification Search
USPC ......................................... 173/171, 104, 217
See application file for complete search history.

(56) References Cited

U.S. PATENT DOCUMENTS

| | | | | |
|---|---|---|---|---|
| 3,595,325 A * | 7/1971 | Libby et al. | .................... | 173/117 |
| 4,751,916 A * | 6/1988 | Bory | ................................ | 601/2 |
| 5,874,681 A * | 2/1999 | Habele | .................... | 73/862.325 |
| 6,536,536 B1 * | 3/2003 | Gass et al. | ......................... | 173/2 |
| 2003/0155141 A1 * | 8/2003 | Maras | .............................. | 173/29 |
| 2011/0094765 A1 * | 4/2011 | Aldrich et al. | ................. | 173/114 |
| 2011/0268516 A1 * | 11/2011 | Short | .............................. | 408/17 |

FOREIGN PATENT DOCUMENTS

| | | |
|---|---|---|
| CN | 200720115929.4 | 2/2008 |
| CN | 200810199000.3 | 2/2009 |
| TW | 200836861 | 9/2008 |

* cited by examiner

*Primary Examiner* — Brian D Nash
(74) *Attorney, Agent, or Firm* — WPAT, PC; Justin King

(57) ABSTRACT

A modularized ultrasonic vibration machining apparatus is provided, which includes a tool holder module. The tool holder module further includes: a housing, having a positioning pin disposed thereon; a tool holder linking part, disposed in the housing; a transmitting mechanism, disposed in the housing and linked to the tool holder linking part in a transmission manner; an expanding device, disposed in the housing and linked to the transmitting mechanism in a transmission manner; a piezoelectric element, disposed in the housing and linked to the expanding device; and an electrical connector, disposed in the housing and electrically connected to the piezoelectric element and the positioning pin. Therefore, the modularized tool holder has an internal vibration mechanism and closed circuit setting of power supply, is capable of being assembled and applied conveniently, and has good security, economical efficiency, and applicability in industry.

20 Claims, 4 Drawing Sheets

MODULARIZED ULTRASONIC VIBRATION MACHINING APPARATUS

CROSS-REFERENCE TO RELATED APPLICATION

This application claims the benefit of Taiwan Patent Application No 098146250, filed on Dec. 31, 2009, which is hereby incorporated by reference for all purposes as if fully set forth herein.

BACKGROUND OF THE INVENTION

1. Field of Invention

The present invention relates to a machining apparatus, and more particularly to a modularized ultrasonic vibration machining apparatus capable of facilitating the modularized assembly and application of ultrasonic vibration machining and improving the stability and security of ultrasonic vibration machining.

2. Related Art

The principle of ultrasonic machining (USM) is that a high-frequency vibration tool of 15 kHz to 30 kHz contacts an article to be machined under a certain static pressure with supply of a mixture of an abrasive and water (abrasive slurry), in which the abrasive impacts the article to be machined through the vibration of the front end of the tool, and crushes the article to be machined into tine pieces, so as to remove the material. Generally speaking, the material of the ultrasonic machining is always selected to be a hard and brittle material, such as, glass and ceramics. Since it was unexpectedly found that ultrasound could be used to process in 1927, application of ultrasonic machining has decades of history in industry, and plays an important role in the field of non-conventional machining.

It is difficult to perform conventional twist drilling in machining ceramic materials, and the drill always slips when contacting the workpiece, and resulting in problems of inclined cavity, poor roundness, and difficulties in cuttings excluded. In order to make the ultrasonic machining to be widely applied, with cost effectiveness into consideration, many scholars and experts began to improve the conventional twist drill or study novel methods for machining ceramic materials. Hocheng applied the conventional ultrasonic machining to drill cavities, and the roughness of the cavities, the smoothness and flatness of the edges of the cavity, and the cavity gap are improved significantly. Andrea Stoll found with experiments that, when the conventional drilling machine is assisted with ultrasound, the cuttings are easily cut, and the machining static pressure is low, the service life of the drill is long, and the removal rate of the material is high.

In techniques disclosed in patents, the ultrasound-related patents are summarized as follows. (1) In Taiwan, R.O.C. Patent Publication No. 200836861, an ultrasonic resonance tool head structure is disclosed, which is mainly used to increase trenches on a side wall of a large-scaled ultrasonic tubular tool, after a high-frequency oscillation applied by the tool head is transferred to the tool, oscillation is generated in the trenches in the side wall of the tool, so as to improve the efficiency of the ultrasonic machining.

(2) In China Patent No. 200720115929, an ultrasonic vibration tool head directly linked to a spindle of a numerical control tool machine is disclosed. The tool head has a brush as power contact. Although the contact is designed to be covered, the position of water outlet at the center does not have a waterproof design, such that the design is very unsafe. Furthermore, the rotation function is spindle driving rotation, but the tool head has a non-rotating part (i.e., the brush lead wires and the central water outlet), which is very dangerous when the non-rotating part and the rotating part are jammed.

(3) In China Patent No. 200810199000, a vibration tool is disclosed, which mainly has a motor and a generator therein, such that ultrasonic vibration function is achieved without any external power supply, and power is directly transferred to the piezoelectric sheet in form of internal sensing. In such a structure, different functions are constructed in the same tool head, such that overall size is difficult to be miniaturized. Furthermore, since all the power structures are design in the tool head, the water through center is very dangerous and difficult. In addition, the vibration tool is a special spindle, and cannot be satisfied in a common machining spindle.

It can be known that, the ultrasonic machining technology is still mainly applied to grind, drill, and polish brittle materials, and in metal machining, has poor integration with the conventional machine due to expensive equipment. In order to solve the problems, the present invention provides a modularized ultrasonic vibration machining apparatus, which is applicable to machining machines, so as to perform machining operations, such as grinding and polishing, milling, and drilling, and has the advantages of simple structure and being capable of effectively reducing the cost of the modularized ultrasonic vibration machining apparatus.

SUMMARY OF THE INVENTION

The present invention is directed to a modularized ultrasonic vibration machining apparatus, which is capable of modularizing a tool holder assembled and used together with a machine and enables the modularized tool holder to have an internal vibration mechanism and closed circuit setting of power supply. When being assembled in a machine, the connection of the power path is completed at the same time, such that the modularized ultrasonic vibration machining apparatus has an efficacy of ultrasonic vibration machining, thus having excellent applicability in industry.

The present invention is directed to a modularized ultrasonic vibration machining apparatus, which enables a modularized tool holder of a ultrasonic vibration machining to have excellent assembly performance and stability, and has a simple structure and secure connection design of power path, thus actively and effectively reducing the cost of the modularized ultrasonic vibration machining apparatus, and facilitating the application thereof.

As embodied and broadly described herein, the technical solution employed by the present invention includes a tool holder module. The tool holder module further includes: a housing, having a positioning pin disposed thereon; a tool holder linking part, disposed in the housing; a transmitting mechanism, disposed in the housing and linked to the tool holder linking part in a transmission manner; an expanding device, disposed in the housing and linked to the transmitting mechanism in a transmission manner; a piezoelectric element, disposed in the housing and linked to the expanding device; and an electrical connector, disposed in the housing and electrically connected to the piezoelectric element and the positioning pin.

The technical solution of the present invention further includes: a machining machine and a tool holder module. The machining machine includes: a spindle, having a positioning lock slot, in which the positioning lock slot is couple to a first power line. The tool holder module includes: a housing, having a positioning pin disposed thereon; a tool holder linking part, disposed in the housing, in which the tool holder linking part is assembled and linked to the spindle; an expanding device, disposed in the housing and driven by the tool holder linking part, a piezoelectric element, disposed in the housing and linked to the expanding device; an electrical connector, disposed in the housing and electrically connected to the piezoelectric element and the positioning pin, in which the electrical connector includes a linking part and a connecting part, the connecting part is pivoted to the linking part, and the connecting part achieves the electrical connection in a fixed state. With such structure, when the tool holder linking part is assembled with the spindle, the positioning pin and the positioning lock slot are linked, and the connection of the power path is completed.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to understand and know the structural features and efficacies of the present invention well, the present invention is illustrated in detail with reference to preferred embodiments accompanied with figures as follows.

Figure 1:
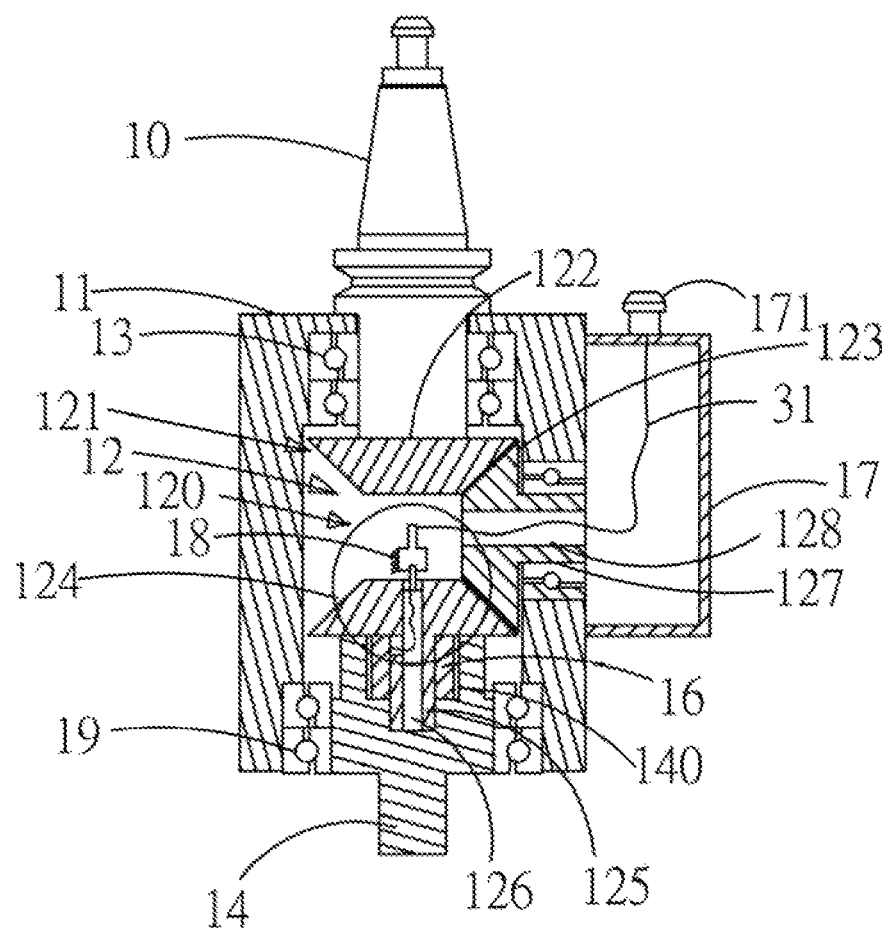
FIG. 1 is a schematic structural view of a preferred embodiment of the present invention.

FIG. 1 is a schematic structural view of a preferred embodiment of the present invention. Referring to FIG. 1, a modularized ultrasonic vibration machining apparatus of this embodiment includes a tool holder module 1. The tool holder module 1 is capable of being assembled on various machining machines, and the machining machine drives the tool holder module 1 to perform rotary machining. The tool holder module 1 further has the mechanism and function of ultrasonic vibration, such that the tool installed on the tool holder module 1 performs various types of machining such as grinding and punching in the manner of rotation and ultrasonic vibration, so as to improve the machining efficiency, and improving the surface conditions of the article to be machined.

The tool holder module 1 is a standard tool holder of BT, 150, HSK (taper specification of table spindle cavity) or having other tool holder structures available in the market. The tool holder module 1 at least includes a housing 11 having an internal accommodating space, a tool holder linking part 10, a transmitting mechanism 12, an expanding device 14, a piezoelectric element 16, and an electrical connector 18. The housing 11 contains a positioning block 17 at a side thereof, and the positioning block 17 has a positioning pin 171 disposed at an end thereof. The tool holder linking part 10 is disposed in the housing 11 and protruded out, a bearing 13 is disposed between the tool holder linking part 10 and the housing 11. The transmitting mechanism 12 is assembled in the housing 11 and linked to an end of the tool holder linking part 10 in a transmission manner. In this embodiment, the transmitting mechanism 12 is a gear set 121 formed by gears engaged to one another, and the gear set 121 includes a first bevel gear 122, a second bevel gear 123, and a third bevel gear 124. The first bevel gear 122 is linked to an end of the tool holder linking part 10 in a transmission manner and is driven by the tool holder linking part 10. The first bevel gear 122 is perpendicular to and engaged with the second bevel gear 123, and the second bevel gear 123 is perpendicular to and engaged with the third bevel gear 124. The second bevel gear 123 is located on the housing 11 with a gear shaft 127, and a receiving space 120 is formed among the first bevel gear 122, the second bevel gear 123, and the third bevel gear 124. Furthermore, the transmitting mechanism 12 may be a belt drive pulley set or other directly driven transmitting mechanisms, so as to enable a spindle of the machining machine 2 to achieve the transmission and speed up effect through the transmitting mechanism 12 in the tool holder module 1.

The expanding device 14 is disposed in the housing 11, and is linked to the transmitting mechanism 12 (third bevel gear 124) in a transmission manner, that is, the expanding device 14 may be driven by the transmitting mechanism 12 to rotate, and a bearing 19 is disposed between the expanding device 14 and the housing 11, such that the expanding device 14 is capable of rotating smoothly. The expanding device 14 has an accommodating space 140 disposed therein. In a suitable implementation, the third bevel gear 124 has a gear shaft 125, and the gear shaft 125 is inserted and linked in the accommodating space 140 of the expanding device 14, so as to drive the expanding device 14 and to be located and supported. The gear shaft 125 further has a shaft space 126 penetrating the third bevel gear 124 at a central part of the gear shaft 125.

The piezoelectric element 16 is a material capable of deforming after being electrified (a piezoelectric material), and thus the piezoelectric element 16 of this embodiment may be a piezoelectric sheet or a piezoelectric vibrator. The piezoelectric element 16 is disposed in the accommodating space 140 of the expanding device 14, for being linked to the expanding device 14. In a suitable implementation, the piezoelectric element 16 is located at an outer side of the gear shaft 125, such that the piezoelectric element 16 has a large operation range with respect to the expanding device 14, and has a uniform and stable vibration (ultrasonic vibration) function.

Figure 2:
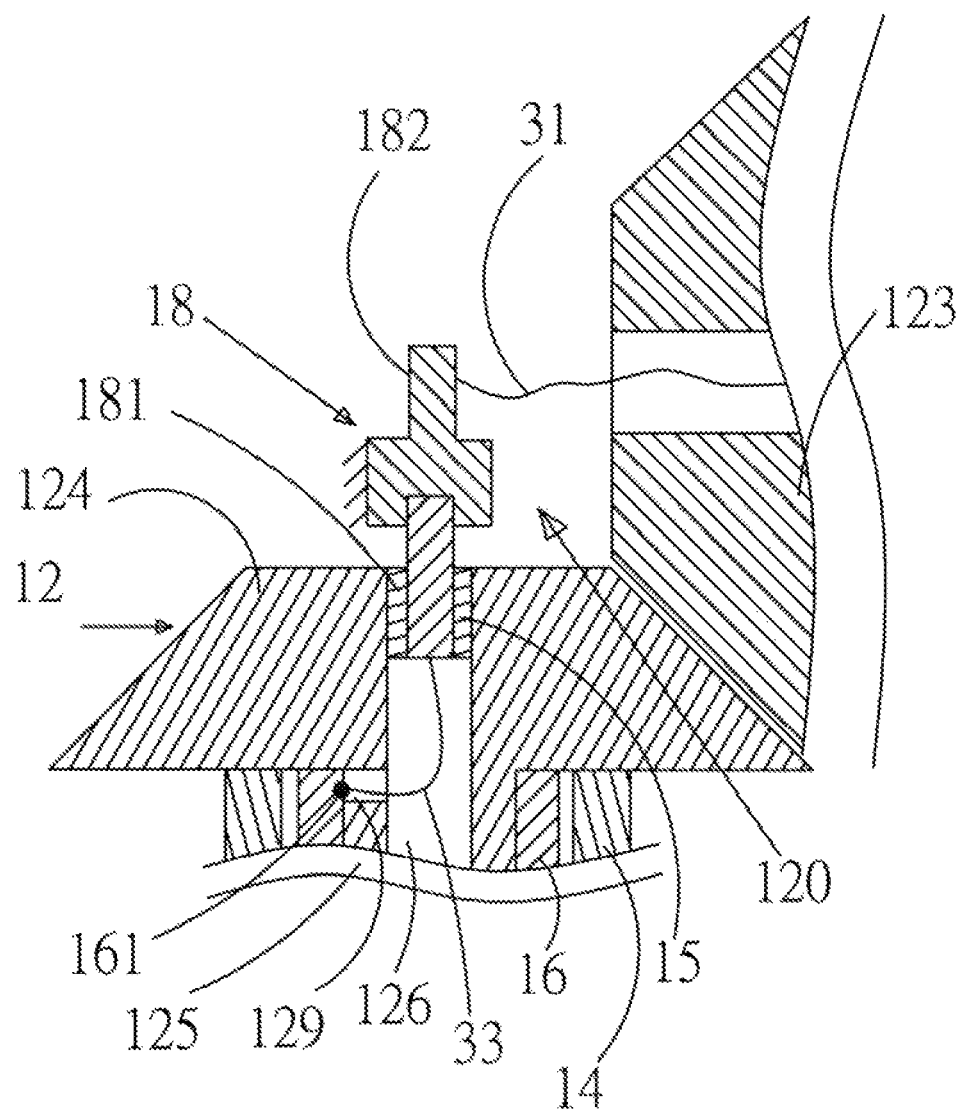
FIG. 2 is a partial schematic structural view of the present invention.

Referring to FIG. 2, the electrical connector 18 is disposed in the receiving space 120 of the transmitting mechanism 12. The electrical connector 18 includes a linking part 181 and a connecting part 182 pivoted to the linking part 181. The linking part 181 has a form of a rod terminal, and is disposed at a site in the shaft space 126 at an opposite end of the third bevel gear 124. An isolating collar 15 is disposed between the linking part 181 and the third bevel gear 124, such that the linking part 181 rotates with the third bevel gear 124. The connecting part 182 is electrically connected to a power supply device, and the linking part 181 is electrically connected to the piezoelectric element 16 (described in detail below), for supplying power from the power supply device to the piezoelectric element 16. Because the connecting part 182 is pivoted to the linking part 181, the connecting part 182 is electrically connected to the power supply device in a fixed state (without rotating), so as to overcome the problem of power supply connection during the operation of the tool holder module 1. As for the electrical connector 18, the power transmission from the connecting part 182 in the fixed state to the linking part 181 in a rotating state may be achieved with a coaxial rotating electrical connector (for example, Model 205H, manufactured by Mercotac Inc, US). The power path of the rotating electrical connector is provided with low resistance by a liquid metal (such as mercury, not shown), in which the resistance is lower than 1 micro-ohm. Furthermore, the whole rotating electrical connector is completely sealed, and has high reliability by means of a ball bearing structure (not shown), thus preventing sparks generated during rotating.

Figure 3:
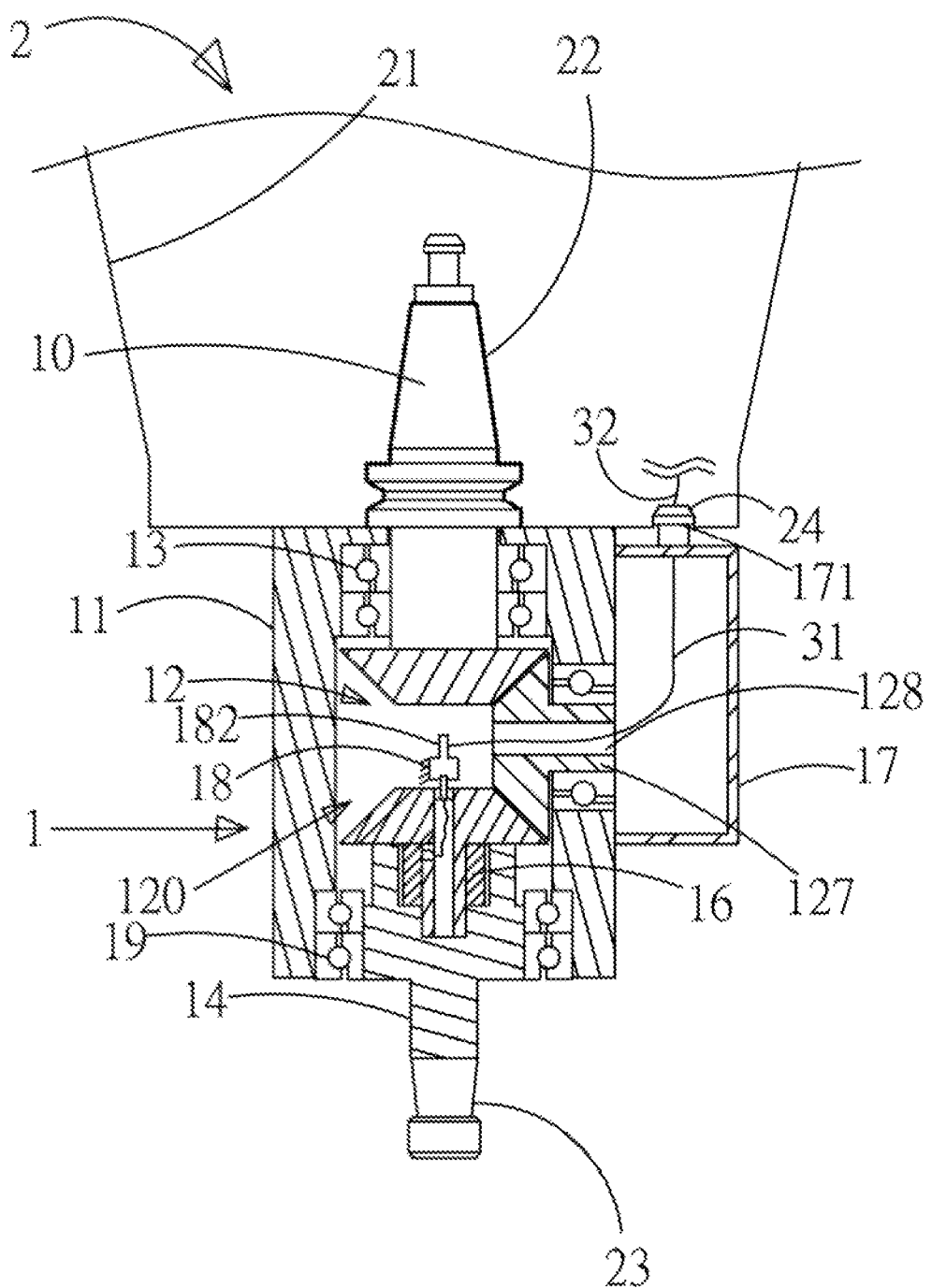
FIG. 3 is a schematic structural view of assembling operation of the present invention.

Referring to FIG. 3, the positioning pin 171 of the tool holder module 1 has a power line 31, and the power line 31 passes through the internal space of the positioning block 17 (housing 11) and a shaft space 128 of the gear shaft 127, enters the receiving space 120, and forms a coupling positioning with the connecting part 182 of the electrical connector 18. The positioning pin 171 of the positioning block 17 is coupled to the positioning lock slot 24 of the machining machine 2. Accordingly, the positioning lock slot 24 is coupled to a power line 32, and the power line 32 is coupled to a power source. Alternatively, a power supply device (not shown) installed in the machining machine 2 is utilized, such that a power is provided to the positioning lock slot 24 through the power line 32 (or other power paths), and thus the power of the power supply device is transferred to the connecting part 182 of the electrical connector 18 through the power line 32, the positioning lock slot 24, the positioning pin 171, and the power line 31.

Referring to FIG. 2 again, the third bevel gear 124 has a through hole 129 disposed therein, and the through hole 129 is located in the gear shaft 125. In this embodiment, the through hole 129 is corresponding to a contact 161 of the piezoelectric element 16. A lead 33 passes through the shaft space 126 and the through hole 129, such that the power is transferred from the linking part 181 of the electrical connector 18 to the contact 161 of the piezoelectric element 16. Alternatively, in another embodiment, the contact 161 of the piezoelectric element 16 may extend into the shaft space 126, so as to be connected to the lead 33. The lead 33 passes through the through hole 129, and the power is transmitted from the linking part 181 of the electrical connector 18 to the contact 161 of the piezoelectric element 16, and thus the arrangement of the power path of the present invention is completed.

The installation and operation of the modularized ultrasonic vibration machining apparatus of the present invention is described as follows. The tool holder module 1 is assembled on the spindle 21 (as shown in FIG. 3) of the machining machine 2 (such as a conventional milling machine or a numerical control milling machine). The spindle 21 has a taper spindle cavity 22 disposed therein, and the spindle 21 has a positioning lock slot 24 disposed at a side opposite to the positioning pin 171 of the housing 11. When the tool holder module 1 of the present invention is disposed in the machining machine 2, the tool holder linking part 10 of the tool holder module 1 is assembled in the spindle cavity 22 of the spindle 21, and the positioning pin 171 is positioned and fixedly linked to the positioning lock slot 24, so as to position the housing 11 on the spindle 21, such that the tool holder linking part 10 of the tool holder module 1 is capable of rotating with the spindle 21 integrally. Furthermore, the expanding device 14 of the tool holder module 1 has a fixture 23 (such as a sleeve), disposed at an end thereof. The fixture 23 is used for clamping any machining tool (not shown) to perform ultrasonic vibration machining operation.

The spindle 21 of the machining machine 2 drives the tool holder linking part 10 to rotate, the tool holder linking part 10 drives the first bevel gear 122 of the transmitting mechanism 12 to rotate, and the first bevel gear 122 drives the second bevel gear 123, the third bevel gear 124, and the expanding device 14 to rotate, such that the fixture 23 connected to the expanding device 14 and the machining tool clamped by the fixture 23 are enabled to rotate, so as to perform machining operation and application, such as grinding and polishing, milling, and drilling.

In the present invention, the tool holder module 1 is assembled with the spindle 21 of the machining machine 2, the positioning pin 171 and the positioning lock slot 24 are combined and positioned, such that the connection of external power source (power lines 31, 32) is completed simultaneously. The power is introduced to the piezoelectric element 16 through the electrical connector 18, and the piezoelectric element 16 deforms when being electrified, such that the expanding device 14 is enabled to generate vibration (or ultrasonic vibration), and thus the machining tool connected to the expanding device 14 is capable of perform machining operation and application, such as (ultrasonic) vibration grinding and polishing/milling/drilling.

Moreover, the power introduced to the piezoelectric element 16 by the electrical connector 18 may be transferred by a coaxial rotating electrical connector, so as to eliminate the risk of explosion caused by sparks of conventional carbon brush in high dust environment.

Furthermore, the present invention may also carry a high-performance transmitter, so as to automatically search frequency or automatically reset or automatically reset to search frequency according to change of the resonance frequency with the machining process, such that the machining efficiency is always maintained at an optimal state. The present invention may further be provided with the capacity of high-pressure water through center, such that high-pressure water still removes the cuttings powerfully and cooling the machining area effectively, even when the machining structure is thin, small, and deep during micro machining.

Figure 4:
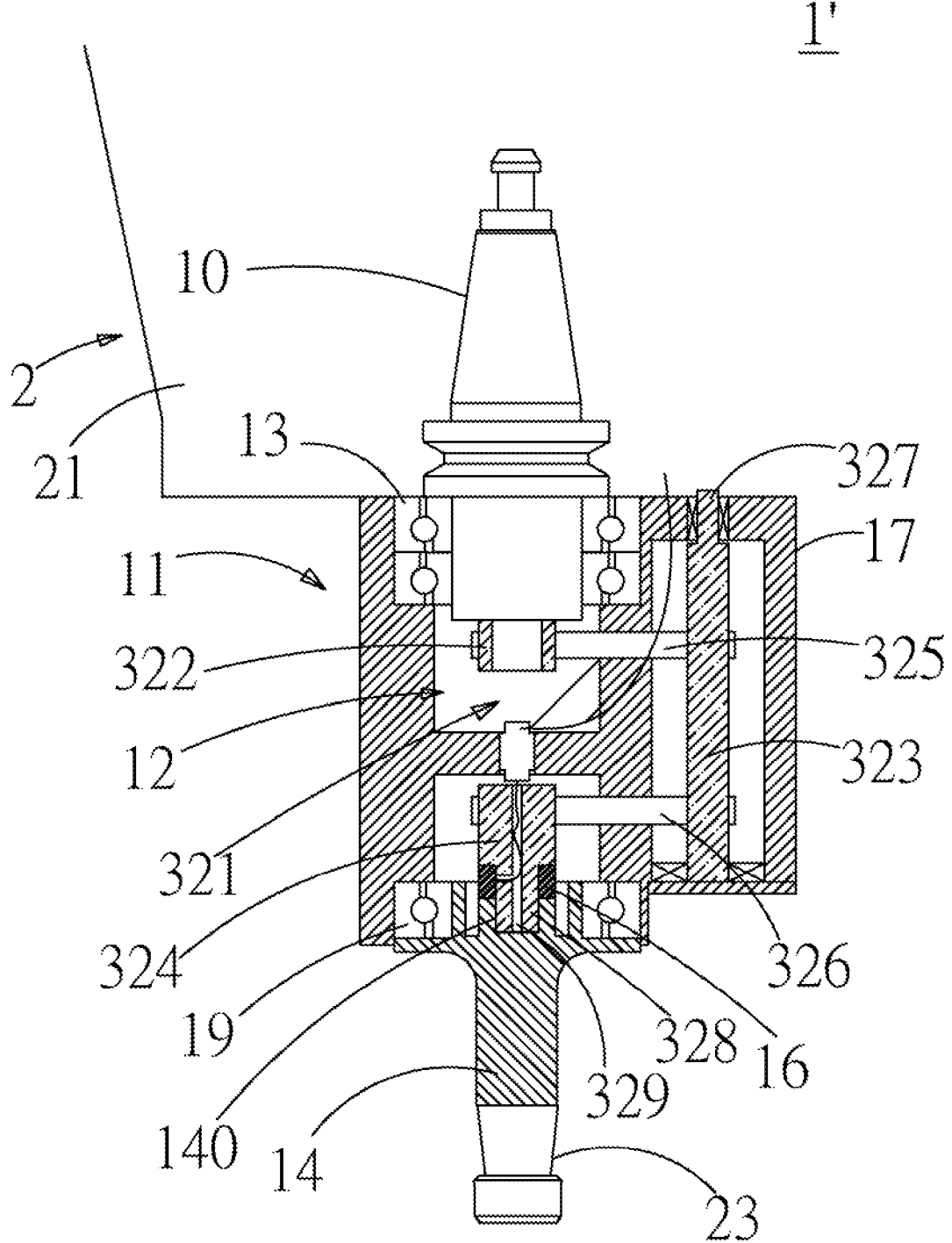
FIG. 4 is a schematic structural view of a second embodiment of the present invention.

Referring to FIG. 4, a schematic structural view of a second embodiment of the present invention is shown, in which the same parts as those in the tool holder module 1 shown in FIG. 1, FIG. 2, and FIG. 3 are marked with the same reference numerals, and are not repeated herein. As shown in FIG. 4, a tool holder module 1' according to the second embodiment is approximately the same as the tool holder module 1 of the first embodiment, and the difference lies in that a transmitting mechanism 12' of this embodiment is constructed by a belt drive pulley set 321. The belt drive pulley set 321 includes a first belt drive pulley 322, a second belt drive pulley 323, and a third belt drive pulley 324. The first belt drive pulley 322 is linked to one end of the tool holder linking part 10 to be driven thereby, the first belt drive pulley 322 is connected with the second belt drive pulley 323 through a first transmitting belt 325 to move simultaneously, and the second belt drive pulley 323 is connected with the third belt drive pulley 324 through a second transmitting belt 326 to move simultaneously. The second belt drive pulley 323 is pivoted to the housing 11 (the positioning block 17) through a rotating shaft 327 thereof, so as to enable a spindle of the machining machine 2 to achieve the transmission and speed up effect through the transmitting mechanism 12' in the tool holder module 1'.

Similarly, the expanding device 14 (such as an expander) is linked to the third belt drive pulley 324 of the transmitting mechanism 12', that is to say, the expanding device 14 can be driven by the transmitting mechanism 12' to rotate, and the expanding device 14 has an accommodating space 140 disposed therein. In a suitable implementation, the third belt drive pulley 324 has an axis 328, and the axis 328 is linked to the expanding device 14 by inserting in the accommodating space 140 of the expanding device 14, for driving the expanding device 14 and obtaining positioning support. The axis 328 further has a shaft space 329 penetrating the third belt drive pulley 324 disposed at the central part thereof. In this embodiment, the piezoelectric element 16 is sandwiched between the expanding device 14 and the transmitting mechanism 12' (the third belt drive pulley 324). The manner of supplying power of the power supply device to the piezoelectric element 16 is the same as that in the first embodiment, and is not repeated herein.

When the modularized ultrasonic vibration machining apparatus of the present invention performs ultrasonic vibration machining operation, the spindle 21 of the machining machine 2 drives the tool holder linking part 10 to rotate, the tool holder linking part 10 drives the first belt drive pulley 322 of the transmitting mechanism 12' to rotate, and the first belt drive pulley 322 further drives the second belt drive pulley 323, the third belt drive pulley 324 and the expanding device 14 to rotate, such that the fixture 23 connected to the expanding device 14 and the machining tool clamped by the fixture 23 are enabled to rotate, so as to perform machining operation and application, such as grinding and polishing, milling, and drilling.

It can be known from the above that, the modularized ultrasonic vibration machining apparatus of the present invention enables the original machining machine to generate rotary machining and ultrasonic vibration machining, thus effectively improving the machining efficiency, and improving the surface situation of the article to be machined. In the present invention, due to the arrangement of power path in the effective, when the tool holder module is installed in the machining machine, the input path design of the external power source is completed simultaneously through the positioning and linking of the positioning pin and the positioning lock slot, such that the modularized design of the ultrasonic vibration tool holder is achieved, and has the positive advantages of simple structure, flexible application, and low cost, thus having excellent applicability in industry.

The above description is only a preferred embodiment of the present invention, but is not intended to limit the scope of implementation of the present invention. Any equivalent variations and modifications made according to the shapes, structures, features, and spirit of the scope of the claims of the present invention fall within the scope of the claims of the present invention.

What is claimed is:

1. A tool holder module, comprising:
    a housing, having a positioning pin disposed thereon;
    a tool holder linking part, disposed on the housing;
    a transmitting mechanism, disposed in the housing and linked to the tool holder linking part in a transmission manner;
    an expanding device, disposed in the housing and linked to the transmitting mechanism in a transmission manner;
    a piezoelectric element, disposed in the housing and linked to the expanding device;
    an electrical connector, disposed in the housing and electrically connected to the piezoelectric element and the positioning pin, and comprising a linking part and a connecting part, wherein the connecting part is pivoted to the linking part, and the connecting part achieves an electrical connection in a fixed state.

2. The tool holder module according to claim 1, wherein the transmitting mechanism is a gear set, a belt drive pulley set or a directly driven transmitting mechanism.

3. The tool holder module according to claim 2, wherein the gear set comprises:
    a first bevel gear, linked to an end of the tool holder linking part in a transmission manner and driven by the tool holder linking part;
    a second bevel gear, engaged with the first bevel gear; and
    a third bevel gear, linked to the expanding device in a transmission manner, and engaged with the second bevel gear.

4. The tool holder module according to claim 3, wherein an accommodating space is disposed in the expanding device, and the piezoelectric element is disposed in the accommodating space.

5. The tool holder module according to claim 4, wherein the third bevel gear has a gear shaft, the gear shaft is inserted and linked in the accommodating space of the expanding device, and a shaft space penetrating the third bevel gear is disposed at a central part of the gear shaft, and the piezoelectric element is located at an outer side of the gear shaft.

6. The tool holder module according to claim 5, wherein the linking part is disposed at a site in the shaft space at an opposite end of the third bevel gear, an isolating collar is disposed between the linking part and the third bevel gear, and the linking part rotates along with the third bevel gear.

7. The tool holder module according to claim 3, wherein the piezoelectric element has a contact, and the third bevel gear has a through hole disposed therein, and the through hole is corresponding to the contact of the piezoelectric element, the electrical connector further comprises a lead passing through the through hole, so as to transfer power from the linking part of the electrical connector to the contact of the piezoelectric element.

8. The tool holder module according to claim 7, wherein the positioning pin has a power line, the power line and the connecting part of the electrical connector form a coupling positioning, so as to transmit power from the positioning pin to the connecting part of the electrical connector.

9. The tool holder module according to claim 2, wherein the belt drive pulley set comprises:
    a first belt drive pulley, linked to one end of the tool holder linking part;
    a second belt drive pulley, pivoted to the housing;
    a third belt drive pulley, linked to the expanding device;
    a first transmitting belt, for connecting the first belt drive pulley and the second belt drive pulley to move simultaneously; and
    a second transmitting belt, for connecting the second belt drive pulley and the third belt drive pulley to move simultaneously.

10. An ultrasonic vibration machining apparatus, comprising:
    a machining machine, comprising a spindle, wherein the spindle has a positioning lock slot, and the positioning lock slot is coupled to a first power line; and
    a tool holder module, assembled to the spindle and comprising:
        a housing, having a positioning guide pin disposed thereon;
        a tool holder linking part, disposed in the housing, and assembled and linked to the spindle;
        an expanding device, disposed in the housing and driven by the tool holder linking part;
        a piezoelectric element, disposed in the housing and linked to the expanding device, wherein the piezoelectric element has a large operation range with respect to the expanding device, and has an ultrasonic vibration function; and
        an electrical connector, disposed in the housing and electrically connected to the piezoelectric element and the positioning pin, and comprising a linking part and a connecting part, wherein the connecting part is pivoted to the linking part, and the connecting part achieve an electrical connection in a fixed state.

11. The ultrasonic vibration machining apparatus according to claim 10, wherein the power line coupled to the positioning lock slot is connected to a power source or a power supply device disposed in the machining machine.

12. The ultrasonic vibration machining apparatus according to claim 10, wherein a transmitting mechanism is disposed between the expanding device and the tool holder linking part to form a transmission link, and the transmitting mechanism is a gear set, a belt drive pulley set or a directly driven transmitting mechanism.

13. The ultrasonic vibration machining apparatus according to claim 12, wherein the gear set comprising:
   a first bevel gear, linked to an end of the tool holder linking part in a transmission manner, and driven by the tool holder linking part;
   a second bevel gear, engaged with the first bevel gear; and
   a third bevel gear, linked to the expanding device in a transmission manner, and engaged with the second bevel gear.

14. The ultrasonic vibration machining apparatus according to claim 13, wherein an accommodating space is disposed in the expanding device, and the piezoelectric element is disposed in the accommodating space.

15. The ultrasonic vibration machining apparatus according to claim 14, wherein the third bevel gear has a gear shaft, the gear shaft is inserted and linked in the accommodating space of the expanding device, and a shaft space penetrating the third bevel gear is disposed at a central part of the gear shaft, and the piezoelectric element is located at an outer side of the gear shaft.

16. The ultrasonic vibration machining apparatus according to claim 15, wherein the linking part is disposed at a site of the shaft space at an opposite end of the third bevel gear, an isolating collar is disposed between the linking part and the third bevel gear, and the linking part rotates with the third bevel gear.

17. The ultrasonic vibration machining apparatus according to claim 13, wherein the piezoelectric element has a contact, the third bevel gear has a through hole disposed therein, and the through hole is corresponding to the contact of the piezoelectric element, the electrical connector further comprises a lead passing through the through hole, for transmitting power from the linking part of the electrical connector to the contact of the piezoelectric element.

18. The ultrasonic vibration machining apparatus according to claim 17, wherein the positioning pin has a second power line, the second power line and the connecting part of the electrical connector form a coupling positioning, so as to transfer power from the positioning pin to the connecting part of the electrical connector.

19. The ultrasonic vibration machining apparatus according to claim 18, wherein the positioning pin is coupled to the positioning lock slot, for transmitting power from the first power line to the second power line.

20. The ultrasonic vibration machining apparatus according to claim 12, wherein the belt drive pulley set comprises:
   a first belt drive pulley, linked to one end of the tool holder linking part;
   a second belt drive pulley, pivoted to the housing;
   a third belt drive pulley, linked to the expanding device;
   a first transmitting belt, for connecting the first belt drive pulley and the second belt drive pulley to move simultaneously; and
   a second transmitting belt, for connecting the second belt drive pulley and the third belt drive pulley to move simultaneously.

* * * * *